United States Patent Office 3,464,789
Patented Sept. 2, 1969

3,464,789
PROCESS OF ISOTOPIC ENRICHMENT BY
BITHERMAL EXCHANGE NH$_3$-H$_2$
Pierre Courvoisier, Orsay, and Irma Lambert, née Pacht,
Antony, France, assignors to Commissariat à l'Energie
Atomique, Paris, France, a French establishment
No Drawing. Filed June 28, 1966, Ser. No. 561,009
Claims priority, application France, June 30, 1965,
22,924
Int. Cl. C01c 1/00; C01b 1/00
U.S. Cl. 23—193                                       11 Claims

ABSTRACT OF THE DISCLOSURE

The present invention relates to an improved process of isotopic enrichment by bithermal exchange of ammonia and hydrogen. The present disclosure is directed to the discovery that the speed of exchange between the gaseous hydrogen and liquid ammonia may advantageously be increased when an ether soluble in said solution is added to the ammoniacal solution of alkali amide. The ether is preferably an acyclic ether or a cyclic ether. The choice of the ether is solely limited by the solubility of said ether in the mixture.

BACKGROUND OF THE DISCLOSURE

The conventional method used for obtaining deuterium-enriched hydrogen consists of utilizing the reaction of isotopic exchange between gaseous hydrogen and liquid ammonia in counter current in two exchange zones of different temperatures, with the exchange being accelerated catalytically at equilibrium. In the low temperature exchange zone, the liquid phase is richer in deuterium than the gaseous phase and the separation factor is high, from 7 to −60° C. (Ravoire, J., Grandcollot, P., Dirian, G., J. Ch. Phys., 60, 130 1963).

The reaction is catalysed by an alkali metal amide dissolved in ammonia; the speed of exchange is still appreciable at −60° C.; however it is weak and equilibrium cannot easily be achieved in an apparatus with countercurrent contact.

Bourke and his colleagues have shown that the speed of this exchange reaction may be increased when there is added to the solution a primary or secondary cyclic aliphatic amine such as dimethylamine or a completely hydrogenated cyclic amine such as pyrrolidine (Bourke, P. J., Kenyon, A. R., Pepper, O., Walker, P. T., AERE Report No. 3,464, 1961—French Patent No. 1,281,601 of Feb. 4, 1961).

However, amines of this type are relatively expensive. It has been discovered according to the present invention that the speed of exchange between the gaseous hydrogen and liquid ammonia may advantageously be increased when to the ammoniacal solution of alkali amide there is added an ether soluble in said solution. The ether is preferably an acyclic ether oxide such as methoxymethane, ethoxyethane or a cyclic ether such as tetrahydrofurane, or a homologue such as methyltetrahydrofurane. The choice of ether is solely limited by the solubility of ether in the mixture NH$_3$-NH$_2$K.

It is necessary that the ether is free from oxidising impurities such as oxygen, peroxides and all impurities such as water or alcohols which would react with the alkali amide catalyst and which would destroy it.

With an ether such as ethoxyethane, an industrial solvent is available which is cheaper than an amine and which permits the speed of the ammonia-hydrogen exchange to be increased in at least similar proportions.

In the improved method of isotopic enrichment by a bithermal exchange of ammonia and hydrogen according to the invention, the gaseous hydrogen and a liquid mixture, constituted by the solution of alkali amide in an ammonia-ether mixture, are contacted in countercurrent, in reactors regulated to two different temperatures. The current of hydrogen is firstly sent into the low temperature reactor (or cold tower) where it becomes impoverished of deuterium to the profit of the liquid mixture; the current of hydrogen then passes into the high temperature reactor (or hot tower) where the conditions of equilibrium are different and where the ammonia in the liquid mixture is in its turn deprived of the deuterium to the profit of the hydrogen; the result is that the deuterium is concentrated in two gaseous and liquid currents, between one reactor and the other. This system avoids the necessity of chemically converting one current into the other in order to obtain the reflux.

In order that the invention may be more clearly understood the following non-limiting examples are given purely by the way of illustration.

EXAMPLE 1

To 104 cm.$^3$ of liquid ammonia containing 3.5 g. of potassium amide, there is added 11 cm.$^3$ of ethoxyethane. A current of gaseous deutreium is made to bubble into the liquid mixture thus obtained which is placed in a vertical tube; the height of the liquid traversed by the gas is about 31 cm. The content $x$ of protonium in the gas (illustrating the exchange between the hydrogen of the liquid ammonia and the deuterium) is determined, after trapping the condensable vapors, at the output of the reactor, with the aid of a thermal conductivity cell. When the temperature of the liuid is −40° C., $x=5.1\%$. At −70° C., the solution being saturated with potassium amide, $x=2.1\%$.

EXAMPLE 2

The process described in Example 1 is repeated but tetrahydrofurane (11 cm.$^3$) is used in place of the ethoxyethane, and 114 cm.$^3$ of liquid ammonia containing 3.5 g. of potassium amide is used. At −40° C., $x=4.25\%$; at −70° C., $x=1.3\%$.

In the course of a similar experiment with 112 cm.$^3$ of ammonia and 3.5 g. of potassium amide, but without the addition of ether at −40° C., $x=3.3\%$; at −70° C., $x=0.87\%$.

EXAMPLE 3

To 110 cm.$^3$ of liquid ammonia containing 1.7 g. of potassium amide, there is added 23.5 cm.$^3$ of methyl ether under the same operating conditions as in Example 1. At −60° C., $x=2.93\%$; at −50° C., $x=4.36\%$. Under the same conditions but in the absence of methyl ether, at −60° C., $x=1.87\%$; at −50° C., $x=2.83\%$.

In order to compare the increase in the reaction speed caused by the addition of an ether with that caused by the addition of an amine, two experiments were conducted as previously.

Experiment No. 1

To 88 cm.$^3$ of ammonia containing 3 g. of dissolved potassium amide, there is added 12 cm.$^3$ of dimethylamine; at −40° C., $x=4.9\%$, at −70° C., when the solution is saturated with potassium amide, $x=2.63\%$.

Experiment No. 2

With 100 cm.$^3$ of ammonia containing 3 g. of potassium amide, without the addition of amine, at −40° C., $x=2.8\%$; at 70° C., $x=0.70\%$.

The improvement gained by the addition of 9.5% ethoxyethane is shown by a factor of 1.8 at −40° C. and 3 at −70° C. and that gained by the addition of 12% of dimethylamine by a factor of 1.7 at −40° C. and 3.7 at −70° C.

We claim:

1. An improved process of isotopic enrichment by countercurrent isotopic exchange between liquid ammonia and gaseous hydrogen in two exchange zones of different temperatures, which comprises contacting gaseous hydrogen with a liquid mixture comprised of ammonia and an ether soluble in the ammonia, and containing in solution a catalyst for the exchange reaction between the liquid ammonia and the gaseous hydrogen.
2. A process as claimed in claim 1, where said catalyst is an alkali amide.
3. A process as claimed in claim 2, wherein said alkali amide is potassium amide.
4. A process as claimed in claim 1, wherein said ether is free from oxidising impurities and impurities detrimental to the catalyst.
5. A process as claimed in claim 1, wherein the ether is an acyclic ether.
6. A process as claimed in claim 1, wherein the ether is cyclic ether.
7. A process as claimed in claim 5, wherein said acyclic ether is methoxymethane.
8. A process as claimed in claim 5, wherein said acyclic ether is ethoxyethane.
9. A process as claimed in claim 6, wherein said cyclic ether is tetrahydrofurane.
10. A process as claimed in claim 6, wherein said cyclic ether is a homologue of tetrahydrofurane.
11. A process as claimed in claim 10, wherein said cyclic ether is methyltetrahydrofurane.

References Cited

FOREIGN PATENTS 1,281,601  12/1961  France.

OTHER REFERENCES

Franklin et al.: American Chemical Journal, vol. 20, 1898, pp. 820, 831–832.

OSCAR R. VERTIZ, Primary Examiner

H. S. MILLER, Assistant Examiner

U.S. Cl. X.R.

252—438; 23—210